United States Patent
Wu et al.

(10) Patent No.: US 11,359,322 B2
(45) Date of Patent: Jun. 14, 2022

(54) WASHING BARREL AND WASHING MACHINE PROVIDED WITH THE WASHING BARREL

(71) Applicants: QINGDAO HAIER WASHING MACHINE CO., LTD., Shandong (CN); QINGDAO HAIER SMART TECHNOLOGY R&D CO., LTD., Shandong (CN); HAIER SMART HOME CO., LTD., Shandong (CN)

(72) Inventors: Di Wu, Shandong (CN); Xinghui Hao, Shandong (CN); Chunfeng Lao, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 0 days.

(21) Appl. No.: 16/976,021

(22) PCT Filed: Feb. 21, 2019

(86) PCT No.: PCT/CN2019/075739
§ 371 (c)(1),
(2) Date: Aug. 26, 2020

(87) PCT Pub. No.: WO2019/165928
PCT Pub. Date: Sep. 6, 2019

(65) Prior Publication Data
US 2020/0399810 A1    Dec. 24, 2020

(30) Foreign Application Priority Data
Feb. 27, 2018    (CN) .......................... 201810162122.9

(51) Int. Cl.
*D06F 37/12* (2006.01)
*D06F 23/04* (2006.01)
*D06F 39/08* (2006.01)

(52) U.S. Cl.
CPC .............. *D06F 37/12* (2013.01); *D06F 23/04* (2013.01); *D06F 39/083* (2013.01)

(58) Field of Classification Search
CPC ......... D06F 37/12; D06F 23/04; D06F 39/083
(Continued)

(56) References Cited

U.S. PATENT DOCUMENTS 4,651,542 A * 3/1987 Kohsaka ................. D06F 13/02
68/174
2013/0036776 A1* 2/2013 Seo ........................ D06F 37/206
68/18 F

FOREIGN PATENT DOCUMENTS

CN    2397150 Y    9/2000
CN    2659923 Y    12/2004
(Continued)

OTHER PUBLICATIONS

KR101589076B1—machine translation (Year: 2016).*
(Continued)

*Primary Examiner* — Tinsae B Ayalew
(74) *Attorney, Agent, or Firm* — Buchanan Ingersoll & Rooney PC (57) ABSTRACT

The present disclosure belongs to the field of washing machines, in particular to a washing barrel and a washing machine having the washing barrel. The washing barrel is configured to accommodate washing water. The washing barrel comprises a barrel body and a drainage channel being arranged on a side wall of the barrel body and configured to discharge washing water in the barrel body out of the barrel body during dehydrating. The drainage channel is provided
(Continued)

with a water inlet communicated with an inside of the barrel body; and the barrel body is provided with a guiding part used to guide washing water in the barrel body into the water inlet during dehydrating. The present disclosure has the following beneficial effects: through setting the guiding part, the washing water is guided to the drainage channel and discharged through the drainage channel to realize rapid dehydration.

20 Claims, 5 Drawing Sheets

(58) Field of Classification Search
USPC .......................................................... 68/208
See application file for complete search history.

(56) References Cited

FOREIGN PATENT DOCUMENTS

| CN | 204401311 | U | 6/2015 |
|---|---|---|---|
| CN | 105525485 | A | 4/2016 |
| CN | 105714514 | A | 6/2016 |
| CN | 206887505 | U | 1/2018 |
| CN | 107740250 | A | 2/2018 |
| CN | 108729101 | A | 11/2018 |
| CN | 108729102 | A | 11/2018 |
| CN | 108796971 | A | 11/2018 |
| CN | 208440836 | U | 1/2019 |
| CN | 208562854 | U | 3/2019 |
| CN | 208562880 | U | 3/2019 |
| JP | S61181495 | A | 8/1986 |
| JP | 2013141508 | A | 7/2013 |
| JP | 5428470 | B2 | 2/2014 |
| KR | 101589076 | B1 * | 2/2016 |

OTHER PUBLICATIONS

International Search Report (PCT/ISA/210) dated May 29, 2019, by the Chinese Patent Office as the International Searching Authority for International Application No. PCT/CN2019/075739.

Written Opinion (PCT/ISA/237) dated May 29, 2019, by the Chinese Patent Office as the International Searching Authority for International Application No. PCT/CN2019/075739.

* cited by examiner

WASHING BARREL AND WASHING MACHINE PROVIDED WITH THE WASHING BARREL

TECHNICAL FIELD

The present disclosure belongs to the field of washing machines, in particular to a washing barrel and a washing machine provided with the washing barrel.

BACKGROUND

Along with constant development of technology, the demand of consumers on large-capacity washing machines becomes larger and larger. While along with an increase in the capacity of the washing machine, the overall size of the washing machine is inevitably increased, therefore, it is very necessary to provide a washing machine with a small volume and a large capacity. Meanwhile, for the existing washing machine, during washing, water is distributed in a rotating barrel and a water accommodating barrel. That is, water is also distributed between the water accommodating barrel and the rotating barrel, the water consumption volume is large, while this part of water will not participate in washing of clothes, thereby leading to a waste of water resources. For the existing washing machine, dirt easily accumulates between the water accommodating barrel and the rotating barrel, thereby leading to breeding of bacteria. Moreover, since water is distributed between the water accommodating barrel and the rotating barrel, the demand on detergent is also large, thereby leading to a waste of detergent and being not beneficial for saving costs.

Based on the above problems, a washing machine in which the water accommodating barrel is omitted and only the rotating barrel is reserved is proposed. The rotating barrel can accommodate washing water, an inner side wall of the washing barrel is provided with a drainage channel. During dehydrating, the rotating barrel is rotated, such that washing water enters the drainage channel and is discharged through the water outlet of the drainage channel. However, at present, the circumferential direction of a holeless inner barrel is designed with equal diameter. In the dehydration stage, the water is basically evenly distributed on a barrel wall with equal thickness under an action of high-speed centrifugation, which is not conducive to the rapid discharge of water from the inner barrel.

In view of this, the present disclosure is hereby proposed.

SUMMARY

The technical problem to be solved in the present disclosure is to overcome shortcomings of the prior art, and provide a washing barrel and a washing machine with the washing barrel. Through setting a guiding part, the washing water is guided to a drainage channel and discharged through the drainage channel to realize rapid dehydration.

In order to solve the above technical problem, a basic conception of the technical solution adopted in the present disclosure is as follows:

A washing barrel is provided. The washing barrel is configured to accommodate washing water. The washing barrel comprises a barrel body and a drainage channel being arranged on a side wall of the barrel body and configured to discharge washing water in the barrel body out of the barrel body during dehydrating. The drainage channel is provided with a water inlet communicated with an inside of the barrel body; and the barrel body is provided with a guiding part used to guide washing water in the barrel body into the water inlet during dehydrating.

The guiding part is a variable diameter segment formed by increasing a radius of the side wall of the barrel body along a rotating direction of the barrel body during dehydrating; and the drainage channel is arranged on the variable diameter segment.

The variable diameter section in circumferential direction is formed by increasing the radius of at least a segment wall, at an axial direction, of the side wall of the barrel body along the rotation direction of the barrel body during dehydrating.

Preferably, the radius of the side wall of the barrel body is synchronously increased from top to bottom along the rotating direction of the barrel body to form the variable diameter segment in circumferential direction.

Or, the radius of a part, at least arranged between an upper edge and a lower edge of the water inlet, of the side wall of the barrel body increases along the rotating direction of the barrel body during dehydrating, forming the variable diameter segment.

The barrel body is provided with at least one connecting segment in the circumferential direction; the connecting segment and the variable diameter segment are arranged at intervals. Two ends of the connecting segment are respectively connected with the variable diameter segment which is adjacent to the connecting segment to close the barrel body in the circumferential direction.

Preferably, one variable diameter segment and one connecting segment are provided, two ends of the one connecting segment are respectively connected with a head and a tail of the one variable diameter segment, to close the circumference of the barrel body.

Or, multiple variable diameter segments and connecting segments are provided, the connecting segments and the variable diameter segments are arranged at intervals. Two ends of each of the connecting segments are respectively connected with end parts of two variable diameter segments connected with the connecting segment, to close the circumference of the barrel body.

The barrel body is provided with variable diameter segments in the circumferential direction. The variable diameter segments are uniformly distributed in the circumferential direction of the barrel body.

The drainage channel is arranged on an inner wall of the variable diameter segment, and the water inlet is arranged on the drainage channel.

Preferably, the drainage channel is arranged at a part with the biggest radius of the variable diameter segment.

The inner wall of the variable diameter segment is provided with a cover body. The water inlet is arranged on the cover body and faces towards the rotating direction of the barrel body during dehydrating. The cover body forms the drainage channel together with the inner wall of the variable diameter segment and/or the inner wall of the connecting segment in the form of encirclement.

Or, the drainage channel is a drainage pipeline provided with a channel for the washing water to flow through; the water inlet is arranged on the drainage pipeline and faces towards the rotating direction of the barrel body during dehydrating.

An outer wall of the variable diameter segment is provided with a cover body having a concave cavity. The cover body forms the drainage channel together with the outer wall of the variable diameter segment and/or an outer wall of the connecting segment in the form of encirclement. The water inlet is arranged on variable diameter segment or the connecting segment.

The drainage channel is a drainage pipeline provided with a channel for the washing water to flow through; the drainage channel is arranged on the outer wall of the variable diameter segment. The variable diameter segment or the connecting segment is provided with a dehydrating opening, and the water inlet of the drainage channel is connected with the dehydrating opening.

A washing machine having the above washing barrel is provided.

After the above technical solution is adopted, the present disclosure has the following beneficial effects compared with the prior art:

1. Through setting the guiding part, the washing water is guided to the drainage channel and discharged through the drainage channel to realize rapid dehydration.

2. The guiding part is designed as a variable diameter segment formed by increasing the radius of the side wall of the barrel body along the rotating direction of the barrel body during dehydrating. The variable diameter segment guides the washing water to a place where the radius is greater, and discharges through the drainage channel to realize rapid drainage.

A further detailed description will be given below on specific embodiments of the present disclosure in combination with accompanying drawings.

BRIEF DESCRIPTION OF THE DRAWINGS

As a part of the present disclosure, accompanying drawings are used for providing a further understanding of the present disclosure, schematic embodiments and descriptions thereof of the present disclosure are used for explaining the present disclosure, rather than constituting an improper limit to the present disclosure. Obviously, accompanying drawings described below are merely some embodiments, for those skilled in the art, other drawings can be obtained based on these drawings without any creative effort. In the drawings.

Reference numerals in the figures: 100, washing barrel 101, cover body 102, water inlet 103, water outlet 105, barrel body 107, concave part 108, first side plate 109, second side plate 110, third side plate 112, box body 113, water collecting cavity 114, mounting bottom plate 115, water retaining ring 116, motor 117, suspension rod 118, drain opening 119, plugging structure 120, drainage pipe 121, locking structure 122, balancing ring 132, bottom plate 133, variable diameter segment 134, connecting segment.

It should be noted that, these drawings and text descriptions are not aiming at limiting a conception range of the present disclosure in any form, but to describe concepts of the present disclosure for those skilled in the art with a reference to specific embodiments.

DETAILED DESCRIPTION OF THE EMBODIMENTS

In order to make the object, technical solutions and advantages of the embodiments in the present disclosure clearer, a clear and complete description will be given below on technical solutions in the embodiments in combination with accompanying drawings in the embodiments of the present disclosure. The following embodiments are used for describing the present disclosure, rather than for limiting the scope of the present disclosure.

Embodiment 1

As shown in FIG. 1 to FIG. 4 and FIG. 9, a washing barrel is provided, and the washing barrel 100 can accommodate washing water. The washing barrel 100 includes a barrel body 105 and a drainage channel which is arranged on a side wall of the barrel body 105, and the drainage channel is configured to discharge washing water in the barrel body 105 out of the barrel body 105 during dehydrating. The drainage channel is provided with a water inlet 102 communicated with an inside of the barrel body 105. The barrel body 105 is provided with a guiding part which is configured to guide washing water in the barrel body 105 into the water inlet 102 during dehydrating.

At present, a holeless inner barrel is designed with equal diameter in the circumferential direction. In a dehydrating stage, water is uniformly distributed on a barrel wall basically at an equal thickness under an effect of a high-speed centrifugal force, thereby being not beneficial for rapidly discharging water in the inner barrel. By setting the guiding part, washing water rapidly enters the drainage channel through the water inlet 102 under a guidance of the guiding part. In this way, washing water in the barrel body 105 during dehydrating is rapidly discharged, dehydrating efficiency and dehydrating effect are improved, and dehydrating time is shorten.

The washing barrel 100 is an inner barrel without holes, and the washing barrel 100 has a water accommodating function during washing.

In a further solution, the guiding part is a variable diameter segment 133 formed by increasing a radius of the side wall of the barrel body 105 along a rotating direction during dehydrating. The drainage channel is arranged on the variable diameter segment 133, in this way, the washing water is guided by the variable diameter segment 133 and enters the drainage channel through the water inlet 102.

The radius of the side wall of the barrel body 105 is increased along the rotating direction during dehydrating to form the variable diameter segment 133. Therefore, the radius of the variable diameter segment 133 is increased along the rotating direction during dehydrating. The washing water rapidly moves towards a part with a greater radius along an inner wall of the variable diameter segment under an effect of a centrifugal force, and the drainage channel is arranged on the variable diameter segment 133 to discharge washing water guided by the variable diameter segment out of the barrel body 105.

In a further solution, the radius of at least a section of the side wall in the axial direction of the barrel body 105 increases along the rotation direction during dehydrating, forming the variable diameter segment 133 in circumferential direction.

The washing water in the barrel body 105 firstly climbs upwards along the inner wall of the barrel body 105 under the effect of the centrifugal force to reach the variable diameter segment 133, and then rapidly flows to the drainage channel towards a direction at which the radius increases along the variable diameter segment 133, and enters the drainage channel through the water inlet 102 to be discharged.

Solution 1, the radius of the side wall of the barrel body 105 is synchronously increased from top to bottom along the rotating direction of the barrel body 105 to form the variable diameter segment 133 in circumferential direction.

In the solution, the radius of the barrel body 105 changes synchronously from top to bottom, an area of the side wall, forming the variable diameter segment 133, of the barrel body 105 is large, such that washing water can be rapidly converged and discharged along the variable diameter segment.

With the structure, a position of the water inlet is not limited, water inlet can be realized towards the rotating direction when the barrel body is in the process of dehydration, that is, circumferential water inlet can be realized, and water inlet in a radial direction can also be realized.

Solution 2, the radius of the side wall, at least arranged between an upper edge and a lower edge of the water inlet 102, of the barrel body 105 increases along the rotating direction of the barrel body 105 during dehydrating, forming the variable diameter segment 133.

With the structure, the washing water in the barrel body 105 firstly climbs upwards along the inner wall of the barrel body 105 under the effect of the centrifugal force to reach the variable diameter segment 133, and then flows rapidly to the drainage channel towards the direction at which the radius increases along the variable diameter segment 133. Since the variable diameter segment 133 is arranged on a segment, between the upper edge and the lower edge of the water inlet 102, of the barrel body 105, washing water directly enters the drainage channel through the water inlet 102 and is then discharged out of the barrel body 105 through the drainage channel.

In a further solution, the barrel body 105 is further provided with at least one connecting segment 134 in the circumferential direction. The connecting segment 134 and the variable diameter segment 133 are arranged at intervals, and two ends of the connecting segment 134 are respectively connected with the variable diameter segment 133 which is adjacent to the connecting segment 134 to close the barrel body 105 in the circumferential direction. Since the radius of the variable diameter segment 133 is gradually increased, two variable diameter segments 133 adjacent to each other or a head and a tail of one variable diameter segment 133 cannot be directly closed. Therefore, by setting the connecting segment 134, a circumference of the barrel body 105 is closed. The drainage channel is arranged on the variable diameter segment 133.

Solution 1, the variable diameter segment 133 and the connecting segment 134 are both of one segment, two ends of the connecting segment 134 are respectively connected with the head and the tail of one variable diameter segment 133, to close the circumference of the barrel body 105.

Solution 2, multiple variable diameter segments 133 and connecting segments 134 are available, the connecting segments 134 and the variable diameter segments 133 are arranged at intervals. Two ends of each of the connecting segments 134 are respectively connected with end parts of two variable diameter segments 133 connected with the connecting segment 134, to close the circumference of the barrel body 105. The structure enables the barrel body 105 to be more easily balanced.

In a further solution, the barrel body 105 is provided with multiple variable diameter segments 133 in the circumferential direction, and the variable diameter segments 133 are uniformly distributed in the circumferential direction of the barrel body 105. In this way, the symmetry of the barrel body 105 is better, and the barrel body 105 is easy to be balanced during rotation.

The barrel body 105 is provided with multiple variable diameter segments 133 in the circumferential direction, ends with the smallest radius of all the variable diameter segments 133 are arranged on a same circumference, and ends with the biggest radius of all the variable diameter segments 133 are arranged on another circumference, therefore, the whole barrel body is easily balanced.

A curved radius of each variable diameter segment 133 is changed at a same rate, such that the symmetry of the barrel body is better, and the barrel body is easily balanced.

Embodiment 2

As shown in FIG. 1 to FIG. 4, the present embodiment further defines embodiment 1, the drainage channel can be arranged at an inner side of the barrel body 105. Since the drainage channel is arranged at the inner side of the barrel body 105, a thickness of the washing barrel is not increased, and capacity expansion is facilitated.

The drainage channel is arranged on the inner wall of the variable diameter segment 133, and the water inlet 102 is arranged on the drainage channel. During dehydrating, the washing water climbs along the inner wall of the barrel body 105 and rapidly flows towards the part with a bigger radius in a circumferential direction along the variable diameter segment 133, and the drainage channel is arranged on the inner wall of the variable diameter segment 133, then the washing water is rapidly guided to the drainage channel, enters the drainage channel through the water inlet 102 and is discharged out of the barrel body 105.

Most preferably, the drainage channel is arranged at a part with the biggest radius of the variable diameter segment 133, the water guiding effect is better, and water is drained more rapidly. The water inlet arranged on the drainage channel faces towards the rotating direction of the barrel body, which is, facing the rotating direction of the barrel body when the barrel body is in the process of dehydration. In this way, water inlet in circumferential direction is realized. Or, the water inlet is towards the direction of the axis of the barrel body, and the water inlet is upward, and in this way, water inlet in radial direction is realized.

Solution 1, the inner wall of the variable diameter segment 133 is provided with a cover body 101, the water inlet 102 is arranged on the cover body 101 and faces towards the rotating direction during dehydrating, and the cover body 101 forms a drainage channel together with the inner wall of the variable diameter segment 133 and the inner wall of the connecting segment 134.

Figure 1:
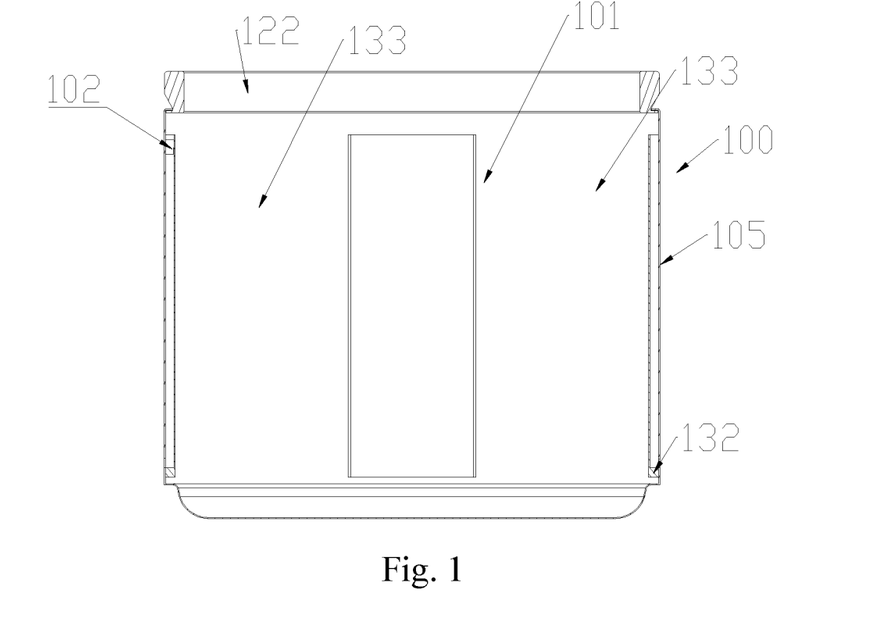
FIG. 1 is a structural schematic diagram of a washing barrel of the present disclosure.
Figure 2:
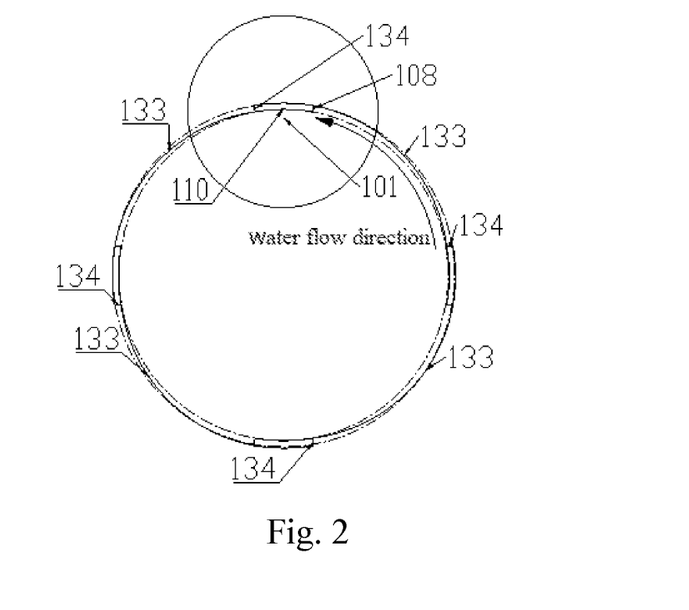
FIG. 2 is a structural schematic diagram of a cross section of a washing barrel of the present disclosure.

Specifically speaking, as shown in FIG. 1 and FIG. 2, the cover body 101 includes a first side plate 108, a third plate 110 and a bottom plate 132. The first side plate 108 faces towards the rotating direction of the barrel body 105 during dehydrating. The third plate 110 is opposite to the variable diameter segment 133. The bottom plate 132 is opposite to a bottom of the barrel body 105. The connecting segment 134 is opposite to the first side plate 108; the first side plate 108 and the connecting segment 134 are arranged at a left side and a right side of the third side plate 110 respectively. The bottom plate 132 is arranged below the first side plate 108. The third side plate 110 is separated from the variable diameter segment 133 by a certain gap to form a channel allowing the water flow to pass through. The first side plate 108, the inner wall of the connecting segment 134 and the third side plate 110 forms the cover body 101 having a concave cavity together, and the water inlet 102 is arranged on the first side plate 108.

Solution 2, the inner wall of the variable diameter segment 133 is provided with a cover body 101 with a concave cavity, the water inlet 102 is arranged on the cover body 101 and faces towards the rotating direction during dehydrating. The cover body 101 and the inner wall of the variable diameter segment 133 forms the drainage channel together.

Figure 3:
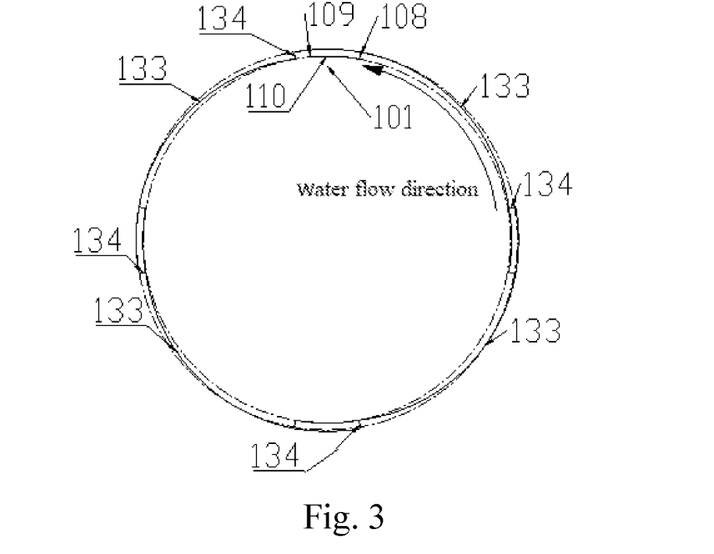
FIG. 3 is a structural schematic diagram of a cross section of another washing barrel of the present disclosure.

Specifically speaking, as shown in FIG. 3, the cover body 101 includes a first side plate 108, a second side plate 109, a third side plate 110 and a bottom plate 132. The first side plate 108 is facing the rotating direction of the barrel body 105 during dehydrating. The second side plate 109 is opposite to the first side plate 108, a third side plate 110 opposite to the inner wall of the variable diameter segment 133. The bottom plate 132 is opposite to the bottom of the barrel body 105. The first side plate 108 and the second side plate 109 are arranged at a left side and a right side of the third side plate 110. The bottom plate 132 is arranged below the first side plate 108. The first side plate 108, the second side plate 109, the third side plate 110 and the bottom plate 132 forms the cover body 101 having a concave cavity together. The water inlet 102 is arranged on the first side plate 108.

In the above two solutions, a water outlet 103 is arranged on the variable diameter segment 133, and covered by the cover body 101. The water outlet 103 is in the concave cavity of the cover body 101. The cover body 101 is fixedly connected with the inner side wall of the barrel body 105.

Solution 3, the inner wall of the variable diameter segment 133 is provided with a cover body 101; the water inlet 102 is arranged on the cover body 101 and is towards the rotating direction of the barrel body 105 during dehydrating. The cover body 101 and the inner wall of the connecting segment 134 forms the drainage channel together.

Specifically speaking, the cover body 101 includes a first side plate 108, an outer side plate, a third side plate 110 and a bottom plate 132. The first side plate 108 faces towards the rotating direction of the barrel body 105 during dehydrating. The outer side plate fits with the inner wall of the variable diameter segment 133. The third side plate 110 is opposite to the outer side plate. The bottom plate 132 is opposite to the bottom of the barrel body 105. The first side plate 108 is opposite to the connecting segment 134. The first side plate 108 and the connecting segment 134 are arranged at a left side and a right side of the third side plate 110, the bottom plate is arranged below the first side plate 108. The first side plate 108, the outer side plate, the inner wall of the connecting segment 134, the third side plate 110 and the bottom plate forms the cover body 101 having a concave cavity together. The water inlet 102 is arranged on the first side plate 108. A water outlet is arranged on the connecting segment, and covered by the cover body 101. The water outlet 103 is in the concave cavity of the cover body 101. And the cover body 101 is fixedly connected with the inner side wall of the barrel body 105.

Figure 4:
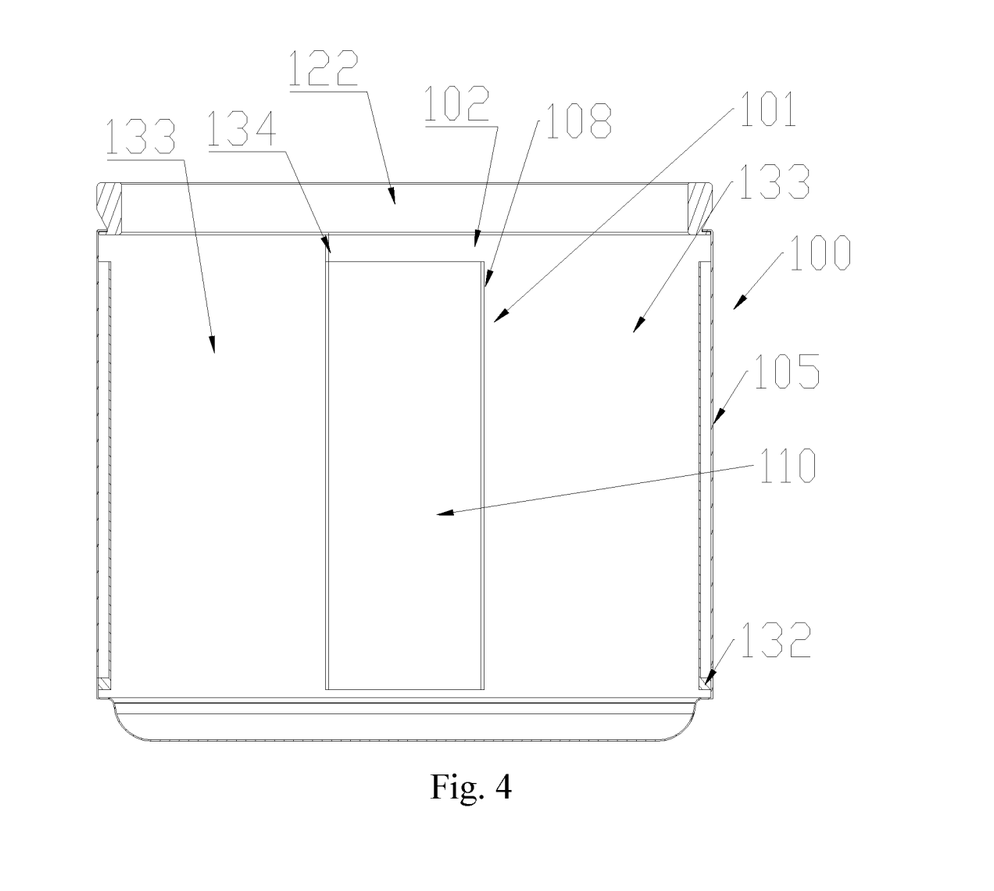
FIG. 4 is a structural schematic diagram of another washing barrel of the present disclosure.

Solution 4, as shown in FIG. 4, the inner wall of the variable diameter segment 133 is provided with a cover body 101; a balancing ring 122 is arranged above the barrel body. A gap is formed between the cover body and the balancing ring, which forms the water inlet. And the cover body 101, the inner wall of the variable diameter segment 133, the connecting segment 134 and the inner wall of the balancing ring forms the drainage channel together. The water inlet 102 is arranged on the cover body 101 and is towards the rotating direction of the barrel body 105 during dehydrating.

Specifically speaking, the balancing ring 122 is arranged above the barrel body, and the cover body 101 is separated from the balancing ring 122 by a certain distance. The cover body 101 includes a first side plate 108, a third side plate 110, and a bottom plate 132. The first side plate 108 faces towards the rotating direction of the barrel body 105 during dehydrating. The third side plate 110 is opposite to the variable diameter segment 133. The bottom plate 132 is opposite to the bottom part of the barrel body 105. The first side plate 108, the third side plate 110 and the bottom plate 132 forms the cover body 101 having a concave cavity together. The connecting segment 134 is opposite to the first side plate 108; the first side plate 108 and the connecting segment 134 are arranged at a left side and a right side of the third side plate 110. The bottom plate 132 is arranged below the first side plate 108; the third side plate 110 is separated from the variable diameter segment 133 by a certain gap to form a channel for water flow to pass through. The first side plate 108, the third side plate 110, the connecting segment 134, the bottom wall 132, the balancing ring 122 and the variable diameter segment 133 forms the drainage channel together. A lower part of the variable diameter segment 133 is provided with a water outlet 103, which is covered by the cover body 101 and in the concave cavity of the cover body 101.

Solution 5, the drainage channel is a drainage pipeline which allows the washing water to flow through. The water inlet 102 is arranged on the drainage pipeline and faces towards the rotating direction of the barrel body 105 during dehydrating.

The barrel body 105 is provided with a drainage outlet, the drainage pipeline is provided with a water outlet 103, and the water outlet 103 is assembled with the drainage outlet, such that the washing water is discharged out of the drainage channel.

Embodiment 3

Figure 5:
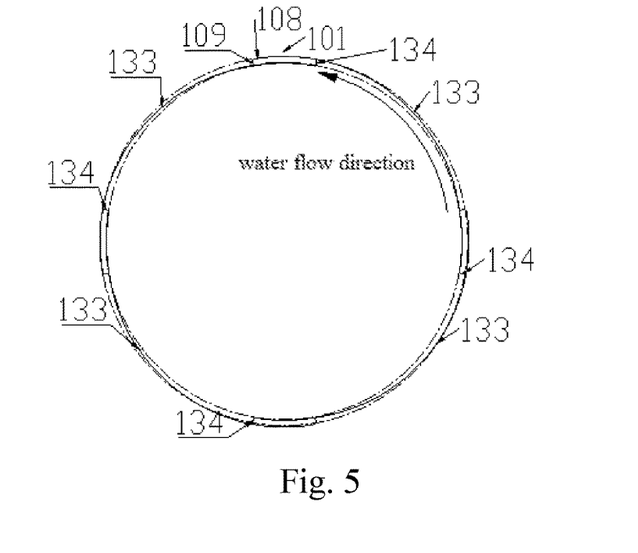
FIG. 5 is a structural schematic diagram of a drainage structure arranged outside the barrel body in the present disclosure.

As shown in FIG. 1 and FIG. 5, the present embodiment further defines embodiment 2, and the drainage channel is arranged on an outer side wall of the barrel body 105, for reducing abrasion to clothes inside the barrel body.

Solution 1, the outer wall of the variable diameter segment 133 is provided with a cover body 101 having a concave cavity. The cover body 101 forms a drainage channel together with the outer wall of the variable diameter segment 133 and an outer wall of the connecting segment 134. The water inlet 102 is arranged on the connecting segment 134, to realize circumferential water inlet.

Specifically, the cover body 101 includes a first side plate 108, a second side plate 109 and a bottom plate 132. The first side plate 108 is opposite to the outer wall, at a part with the smallest radius, of the variable diameter segment 133. The second side plate 109 is opposite to the outer wall of the connecting segment 134. The bottom plate 132 is arranged below the first side plate 108 and the second side plate 109.

The second side plate 109 and the connecting segment 134 are respectively arranged at a left side and a right side of the first side plate 108. And the first side plate 108, the second side plate 109, the bottom plate 132, the outer wall of the variable diameter segment 133 and the outer wall of the connecting segment 134 forms the drainage channel together. in this way, the drainage channel is arranged at a corner formed between the connecting segment 134 and the part with the smallest radius of the variable diameter segment 133, the water inlet 102 is arranged on the connecting segment 134, washing water enters the part with the biggest radius of the variable diameter segment 133 under the guidance of the variable diameter segment 133 and enters the drainage channel through the water inlet 102, thereby realizing circumferential water inlet. Through the structure, impedance to washing water is small, and water inlet is more rapid.

Solution 2, the outer wall of the variable diameter segment 133 is provided with a cover body 101 having a concave cavity. The cover body 101 and the outer wall of the variable diameter segment 133 forms the drainage channel together. And the water inlet 102 is arranged on the variable diameter segment 133 which is opposite to the cover body 101.

Specifically speaking, the cover body 101 includes a first side plate 108, a second side plate 109, a third side plate 110 and a bottom plate 132. The first side plate 108 is opposite to the outer side wall of the variable diameter segment 133. The second side plate 109 and the third side plate 110 are respectively arranged at two sides of the first side plate 108. The bottom plate 132 is arranged below the first side plate 108. The first side plate 108, the second side plate 109, the third side plate 110, the bottom plate 132 and the outer wall of the variable diameter segment 133 forms the drainage channel together. And the water inlet 102 is arranged on the variable diameter segment 133, to realize radial water inlet.

Most preferably, the water inlet 102 is arranged at a part with the biggest radius of the variable diameter segment 133.

Solution 3, the outer wall of the variable diameter segment 133 is provided with a cover body 101 having a concave cavity. The cover body 101 and the outer wall of the connecting segment 134 forms the drainage channel together. And the water inlet 102 is arranged on the connecting segment 134, to realize circumferential water inlet, to reduce obstruction and make water discharge more rapidly.

Solution 4, the drainage channel is a drainage pipeline provided with a channel for the washing water to flow through; the drainage channel is arranged on the outer wall of the variable diameter segment 133. The variable diameter segment 133 or the connecting segment 134 is provided with a dehydrating opening, and the water inlet 102 of the drainage channel is connected with the dehydrating opening.

Wherein the drainage pipeline is arranged at a corner formed between the part with the smallest radius of the variable diameter segment 133 and the connecting segment 134. The dehydrating opening is arranged on the connecting segment 134, the drainage channel has a side wall which is opposite to the connecting segment, the side wall is provided with a water inlet 102. The water inlet of the drainage channel is connected with the dehydrating opening, to communicate the drainage channel with the inside of the barrel body 105 and form circumferential water inlet, thereby improving dehydrating efficiency.

Embodiment 4

Figure 6:
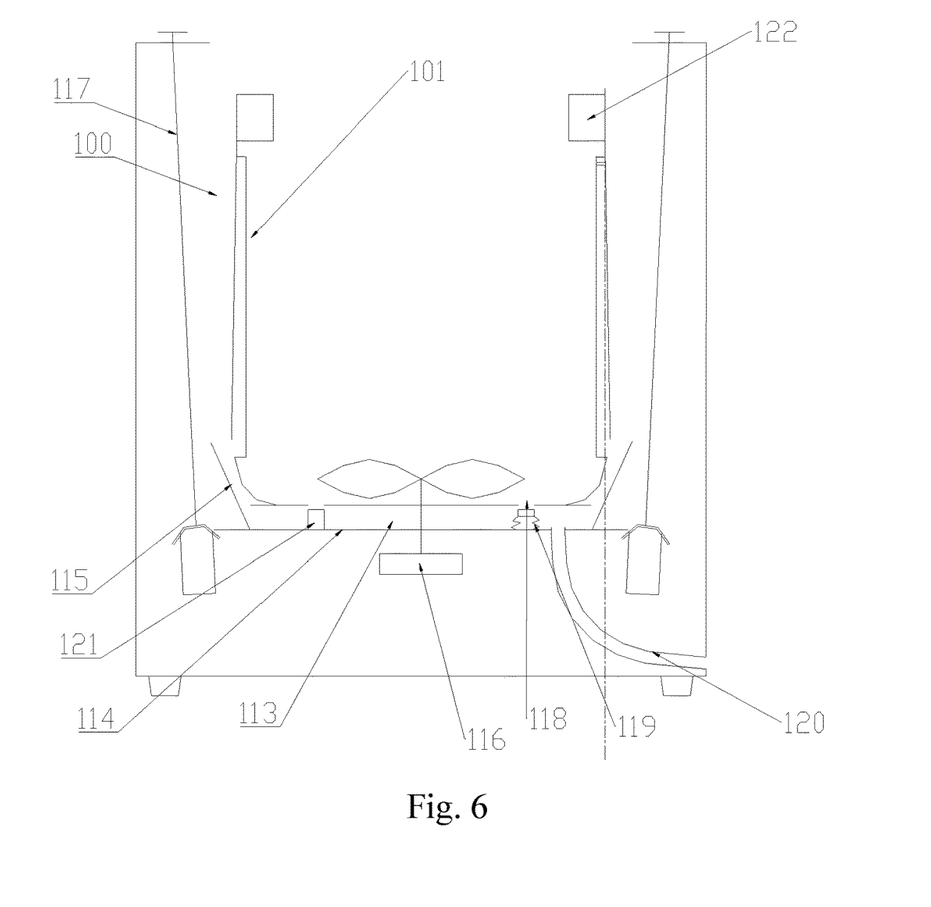
FIG. 6 is a structural schematic diagram of a washing machine in the present disclosure.

As shown in FIG. 6, a washing machine is provided with any washing barrel of embodiment 1 to embodiment 3. The washing machine further includes a box body 112, a water collecting structure and a damping structure. The washing barrel 100, the water collecting structure and the damping structure are arranged in the box body 112. The water collecting structure can collect washing water discharged from the drainage channel. The damping structure is arranged between the water collecting structure and the box body 112 and is connected with the two to reduce vibration of the washing barrel 100 and the water collecting structure.

In a further solution, the damping structure includes a damping suspension rod 117. The water collecting structure is provided with a water collecting cavity 113; the water outlet of the drainage channel is communicated with the water collecting cavity 113. A lower end of the damping suspension rod 117 is connected with the water collecting structure, and an upper end is connected with the box body 112, to suspend the water collecting structure in the box body 112. The water collecting cavity 113 is provided with a drainage pipe 120 which is communicated with an outside, to discharge washing water entering the water collecting cavity 113 out of the washing machine. The balancing ring 122 is arranged above the barrel body 105.

Further, the water collecting structure includes a mounting bottom plate 114 and a water retaining ring 115 arranged above the mounting bottom plate 114. The water retaining ring 115 and the mounting bottom plate 114 forms the water collecting structure together provided with the water collecting cavity 113. The upper end of the suspension rod 117 is connected with an upper end of the box body 112, and the lower end of the suspension rod 117 is connected with the mounting bottom plate 114.

Most preferably, the water collecting structure is arranged below the barrel body 105. The water collecting ring extends from bottom to top towards a direction far away from the axis of the barrel body.

In a further solution, the washing machine further includes a driving device; an output shaft of the driving device penetrates through the mounting bottom plate 114 and is connected with the washing barrel 100 to drive the washing barrel to rotate. The lower end of the damping suspension rod 117 is connected with the mounting bottom plate 114, and the upper end is connected with the upper end of the box body 112, to suspend the driving device, the water collecting structure and the washing barrel 100 in the box body 112. The driving device is a motor.

A lower part of the washing barrel 100 is provided with a drain opening 118 and a plugging structure 119. The inside of the barrel body 105 is communicated with the water collecting cavity 113 via the drain opening 118. During water discharging, the plugging structure 119 opens the drain opening 118, and the drainage pipe 120 is communicated with the water collecting cavity 113, such that washing water entering the water collecting cavity 113 is discharged out of the washing machine through the drainage pipe 120. The plugging structure 119 is an electromagnetic valve plug.

The washing barrel includes the barrel body, the radius of the side wall of the barrel body increases synchronously from top to bottom along the rotating direction of the barrel body to form the variable diameter segment. The barrel body is provided with four variable diameter segments 133 and four connecting segments 134 in the circumferential direction. Four variable diameter segments 133 are uniformly distributed on the circumference of the barrel body 105, and two ends of each of the connecting segments 134 are respectively connected with the adjacent variable diameter segments 133 to close the circumference of the barrel body.

The inner wall, at the part with a big radius, of the variable diameter segment 133 is provided with the cover body having the concave cavity. The cover body 101 includes a first side plate 108, a third side plate 110 and a bottom plate 132. The first side plate 108 is opposite to the connecting segment 134. The third side plate 110 is opposite to variable diameter segment 133 of the barrel body. The bottom plate 132 is arranged below the first side plate. The first side plate 108, the third side plate 110 and the bottom plate 130 together form the cover body 101 having the concave cavity. The lower part of the variable diameter segment 133 is provided with the water outlet 103, which is covered by the cover body and in the concave cavity of the cover body 101. The cover body 101 forms the drainage channel together with the inner wall of the variable diameter segment 133 and the inner wall of the connecting segment 134, and the upper part of the first side plate is provided with the water inlet 103.

Embodiment 5

Figure 7:
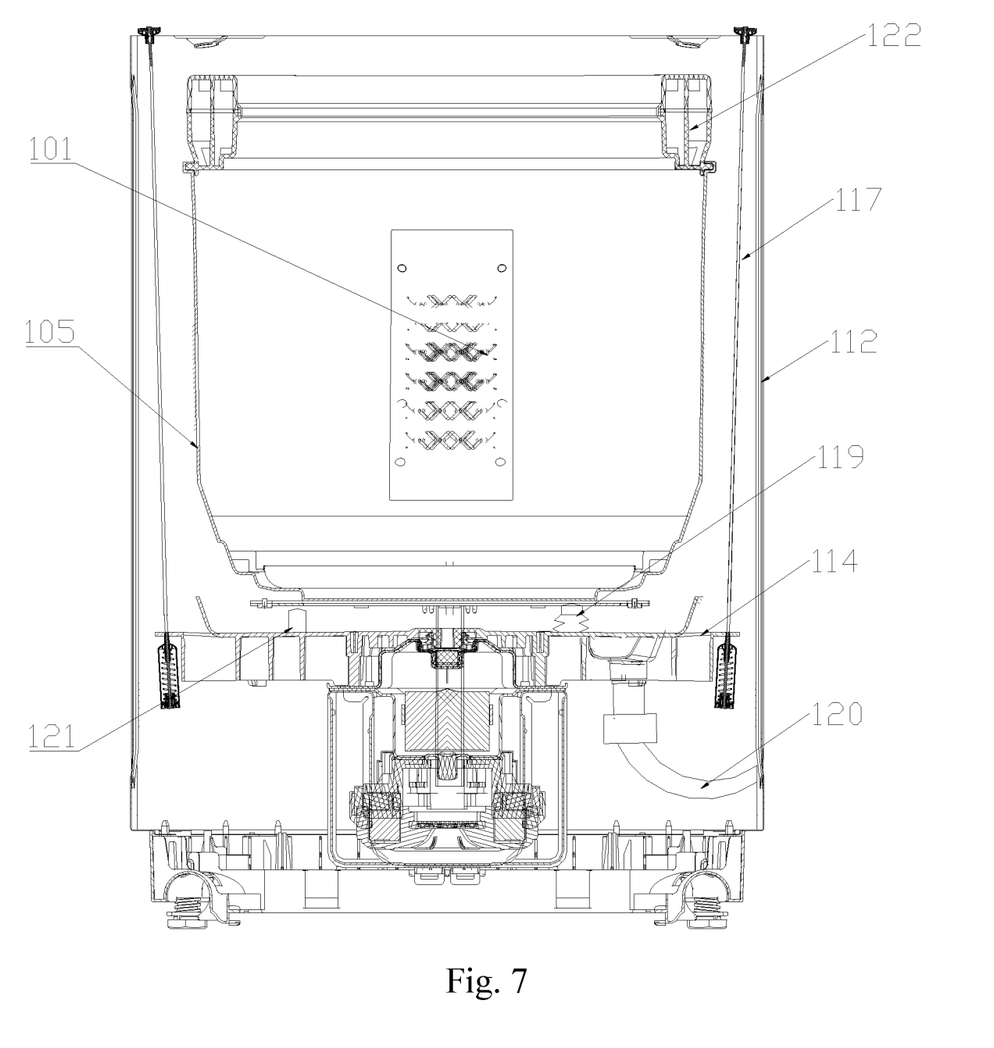
FIG. 7 is a structural schematic diagram of another washing machine in the present disclosure.
Figure 8:
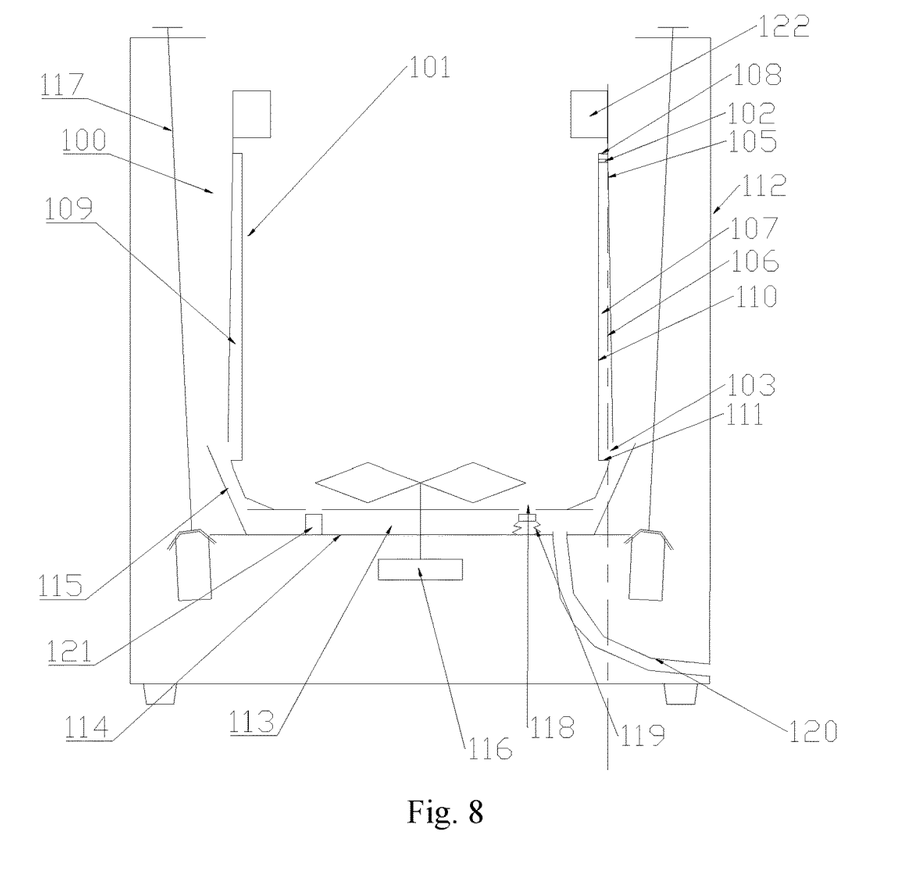
FIG. 8 is a structural schematic diagram of another washing barrel of the present disclosure.
Figure 9:
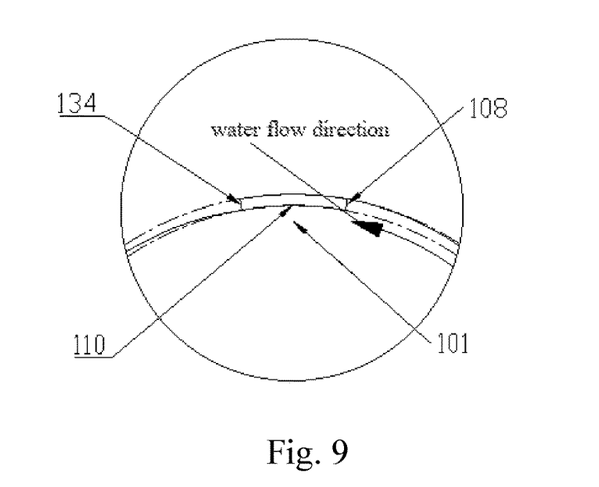
FIG. 9 is an enlarged schematic diagram of part of FIG. 2 of the present disclosure.

As shown in FIG. 7 to FIG. 8, a washing barrel 100 is provided. The washing barrel 100 can accommodate washing water, a side wall of the washing barrel 100 is provided with a drainage channel configured to discharge washing water in the washing barrel 100 during dehydrating, and the drainage channel is provided with a water guiding part, to guide washing water in the drainage channel to discharge rapidly.

The washing barrel 100 can accommodate washing water, during dehydrating, the washing barrel 100 rotates at a high speed, the washing water moves upwards along the inner side wall of the washing barrel 100 under the effect of a centrifugal force, and then enters the drainage channel. Since the centrifugal force is large, washing water entering the drainage channel is difficult to be discharged along the drainage channel. If washing water is discharged under the effect of gravity through deceleration, the service life of the washing machine will be shortened after long-term deceleration and acceleration. In the present disclosure, through setting the water guiding part, washing water entering the drainage channel is guided, and rapid discharge of washing water can be realized with no need of deceleration, so the present disclosure is more economical.

On the basis that the barrel body has a guiding part in embodiment 1 to embodiment 4, the drainage channel can be designed to a washing barrel with the water guiding part, the guiding part of the barrel body guides washing water into the drainage channel, to improve dehydrating effect. Further, the drainage channel is provided with the water guiding part, the water guiding part guides washing water entering the drainage channel, such that the washing water entering the drainage channel is discharged rapidly. Of course, the drainage channel with the water guiding part can also be separately used on the barrel body.

Further, the drainage channel is provided with a water inlet 102, a water outlet 103 and an outer side wall 104 which is far away from the axis of the washing barrel. At least part of the outer side wall 104 of the drainage channel extends from the water inlet 102 to the water outlet 103 in a direction far away from the axis of the washing barrel to form the water guiding part.

At least part of the outer side wall 104 of the drainage channel extends from the water inlet 102 to the water outlet 103 in a direction far away from the axis of the washing barrel to form the water guiding part, such that the radius of the end, close to the water inlet 102, of the outer side wall 104 is smaller, the radius of the end close to the water outlet 103 is bigger. When the washing barrel 100 rotates to dehydrate, the washing water enters the drainage channel from the water inlet 102 with a small radius, and moves along the water guiding part with an increased radius, the centrifugal force exerted on the washing water has a component force towards the direction of the water outlet 103, then the flow velocity of the washing water is accelerated, and the washing water reaches the water outlet 103 to be discharged, the structure is simple and more economical.

Most preferably, the water inlet 102 is arranged at the upper part of the drainage channel, the water outlet 103 is arranged at the lower part of the drainage channel, and the outer side wall 104 of the drainage channel inclines from top to bottom in the direction far away from the axis of the washing barrel to form the water guiding part.

Generally, the inside of the washing barrel 100 is communicated with the drainage channel through the water inlet 102, the drainage channel is communicated with the outside of the washing barrel 100 through the water outlet 103. No other holes are formed on the side wall of the washing barrel 100 except for the water inlet 102 and the water outlet 103, to realize the function of accommodating water of the washing barrel 100.

The drainage pipeline can be formed in multiple manners.

Solution 1: the washing barrel 100 includes a barrel body 105 and a water channel, the water channel is arranged on the side wall of the barrel body 105, the water channel and the side wall of the barrel body 105 together form the drainage channel. The outer side wall 104 of the drainage channel inclines from top to bottom in the direction far away from the axis of the washing barrel to form the water guiding part. The solution is convenient for cleaning the inside of the drainage channel, thereby being more safe and sanitary.

Solution 2: the washing barrel 100 includes a barrel body 105 and a drainage pipeline, the drainage pipeline is set on the side wall of the barrel body 105, the drainage pipeline is internally provided with a channel for the washing water to flow through to form a drainage channel. The outer side wall 104 of the drainage pipeline inclines from top to bottom in the outer side of the barrel body 105 to form the water guiding part. The drainage pipeline separately forms the drainage channel, thereby facilitating assembly, replacement and use.

The channel inside the drainage pipeline can be a circle, a square and other shapes.

Embodiment 6

As shown in FIG. 7 and FIG. 8, the present embodiment further defines embodiment 5, and the drainage channel is arranged at the inner side of the wide wall of the barrel body 105.

Solution 1: the washing barrel 100 includes a barrel body 105 and a water channel, the water channel is arranged on the inner side wall of the barrel body 105, the water channel and the inner side wall of the barrel body 105 together form the water drainage channel. The inner side wall of the barrel body 105 opposite to the water channel inclines from top to bottom in the direction far away from the axis of the washing barrel to form the water guiding part. That is, the barrel wall of the barrel body 105 opposite to the water channel is the outer side wall 104 of the drainage channel, and the barrel wall of the barrel body 105 opposite to the water channel inclines from top to bottom towards the outer side of the barrel body 105 to form the water guiding part. The water channel is arranged on the inner side wall of the barrel body 105, thereby facilitating disassembly, replacement and cleaning. Moreover, the barrel wall of the barrel body 105 opposite to the water channel inclines from top to bottom towards the outer side of the barrel body 105, the occupied space is small, thereby being beneficial for capacity expansion.

Further, part of the barrel wall of the barrel body 105 protrudes outwards to form an accommodation cavity 106 with an opening inward, the water channel is arranged on the opening of the accommodation cavity 106 and forms a drainage channel together with the accommodation cavity 106. The outer side wall of the drainage channel is a bottom wall of the accommodation cavity 106, and the bottom wall of the accommodation cavity 106 inclines from top to bottom towards the outer side of the barrel body 105. The outer side wall 104 of the drainage channel is a bottom wall of the accommodation cavity 106, after washing water enters the drainage channel, since the bottom wall of the accommodation cavity is far away from the center of the barrel body 105, the bottom wall is the outer side wall 104 of the drainage channel, during dehydrating, the washing water is mainly distributed on the bottom wall of the accommodation cavity 106 under the effect of the centrifugal force. Since the bottom wall of the accommodation cavity 106 inclines from top to bottom towards the outer side of the barrel body 105, the washing water drops off rapidly, and is discharged out from the water outlet 103 at the lower part.

Further, the water channel can be a mounting plate, the water inlet 102 is formed on the mounting plate, the water outlet 103 is formed at the bottom wall and/or side wall of the accommodation cavity 106. The mounting plate covers the opening of the accommodation cavity 106 and is connected with the inner wall of the barrel body 105. Part of the barrel wall of the barrel body 105 protrudes outwards to form an accommodation cavity 106 with the opening being inward, and a certain gap is formed between the mounting plate and the bottom wall of the accommodation cavity to form a channel for the washing water to flow. The water channel is a mounting plate, and after installation, the inner wall of the barrel body 105 can be ensured to be smooth, thereby reducing abrasion on clothes.

Most preferably, the mounting plate is a curved plate, and the arc and the inner wall of the barrel body 105 are concyclic, to reduce abrasion on clothes. The water inlet is arranged on the mounting plate, and the mounting plate is provided with a water retaining structure, to guide washing water into the water inlet.

In addition, the water channel can also be a cover body 101 with a concave cavity 107. The water inlet 102 is formed on the cover body 101, the water outlet 103 is formed on the bottom wall and/or side wall of the accommodation cavity 106 of the barrel body 105. The concave cavity 107 of the cover body 101 is opposite to the opening of the accommodation cavity 106 and the cover body 101 is connected with the inner wall of the barrel body 105. The structure can increase the flow rate of the drainage channel through relatively setting the concave cavity 107 of the cover body 101 and the accommodation cavity 106 of the barrel body 105, such that washing water can be discharged rapidly out of the barrel body 105.

Further, the water inlet 102 is set towards the rotating direction of the barrel body when the barrel body 105 rotates to dehydrate, such that washing water easily enters the drainage channel.

In a further solution, the cover body 101 includes a first side plate 108 and a second side plate 109 which are set oppositely, a third side plate 110 arranged between the first side plate 108 and the second side plate 109, wherein the third side plate 110 is opposite to the side wall of the barrel body, and a bottom plate 111 arranged at the bottom of the first side plate 108, the second side plate 109 and the third side plate 110. The first side plate 108, the second side plate 109, the third side plate 110 and the bottom plate 111 together encircle a cover body 101 with a concave cavity. The first side plate 108, the second side plate 109, the third side plate 110, the bottom plate 111 and the inner side wall of the barrel body together form the drainage channel, and the water inlet 102 is arranged on the first side plate 108 and/or the second side plate 109.

In a further solution, the first side plate 108 and the second side plate 109 are both vertical to the inner side wall of the barrel body 105. The first side plate 108 is opposite to the rotating direction of the washing barrel 100 during dehydrating. And the water inlet 102 is arranged on the first side plate 108. Most preferably, the water inlet 102 is arranged to be close to the upper end of the first side plate 108.

Solution 2: the washing barrel 100 includes a barrel body 105 and a drainage pipeline, the drainage pipeline is arranged on the inner side wall of the barrel body 105. The inside of the drainage pipeline is provided with a channel to form a drainage channel. The drainage pipeline is provided with an outer side wall 104 which is towards the outer side of the barrel body 105, the outer side wall 104 of the drainage pipeline inclines from top to bottom towards the outer side of the barrel body 105 to form the water guiding part.

Embodiment 7

The present embodiment further defines embodiment 6, and the drainage channel is arranged at the outer side of the barrel body 105.

Solution 1, the washing barrel 100 includes a barrel body 105 and a water channel, the water channel is arranged on the outer side wall of the barrel body 105, the water channel and the outer side wall of the barrel body 105 together form a drainage channel. The outer side wall of the drainage channel is a side wall, far away from the axis of the barrel body, of the water channel. And the side wall, far away from the axis of the barrel body, of the water channel inclines from top to bottom in the direction far away from the axis of the barrel body to form the water guiding part. During installation, since the internal space of the barrel body 105 is small, the external space is large, the water channel is arranged on the outer side wall 104 of the barrel body 105, thereby facilitating installation of the water channel.

Further, the water channel is a cover body 101 with a concave cavity 107. The barrel body 105 is provided with a water inlet 102, the cover body 101 is provided with a water outlet 103, and the cover body 101 covers the water inlet 102 inside the concave cavity 107 and the cover body 101 is assembled with the outer side wall 104 of the barrel body 105. After the washing water enters the drainage channel formed by the cover body 101 and the side wall of the barrel body 105 from the water inlet 102, the washing water is discharged from the water outlet 103 of the drainage channel.

In a further solution, the cover body 101 includes a first side plate 108 and a second side plate 109 which are set oppositely, a third side plate 110 arranged between the first side plate 108 and the second side plate 109, wherein the third side plate 110 is opposite to the side wall of the barrel body, and a bottom plate 111 arranged at the lower part of the first side plate 108, the second side plate 109 and the third side plate 110. The first side plate 108, the second side plate 109, the third side plate 110 and the bottom plate 111 together encircle a cover body 101 with a concave cavity. The water outlet 103 is arranged on the first side plate 108, or the second side plate 109, or the third side plate 110 or the bottom plate 111. The third side plate 110 inclines from top to bottom towards the outer side of the barrel body 105.

Solution 2: the washing barrel 100 includes a barrel body 105 and a drainage pipeline, the inside of the drainage pipeline is provided with a channel to form the drainage channel. The drainage pipeline is set on the outer side wall of the barrel body 105, the drainage pipeline is provided with an outer side wall far away from the axis of the barrel body, and the outer side wall 104 of the drainage pipeline inclines from top to bottom towards the outer side of the barrel body 105. The drainage pipeline separately forms the drainage channel, thereby facilitating assembly, replacement and use.

Embodiment 8

As shown in FIG. 7 and FIG. 8, a washing machine with a washing barrel 100 of embodiment 5 to embodiment 7 is provided. The washing machine includes a box body 112, the washing barrel 100 is arranged inside the box body 112. The lower part of the washing barrel 100 is provided with a water collecting structure, the water collecting structure is provided with a water collecting cavity 113. The water collecting cavity 113 is provided with a drainage pipe 120 which is communicated with the outside, to discharge washing water entering the water collecting cavity 113 out of the washing machine. The water outlet 103 of the drainage channel is communicated with the water collecting cavity 113, to discharge washing water in the washing barrel 100 during dehydrating into the water collecting cavity 113.

The upper part of the barrel body 105 is provided with a balancing ring 122.

The water collecting structure includes a mounting bottom plate 114 and a water retaining ring 115 arranged on the mounting bottom plate 114. The mounting bottom plate 114 and the water retaining ring 115 together form the water collecting cavity 113. The lower part of the mounting bottom plate 114 is provided with a motor 116, and the output shaft of the motor 116 penetrates through the mounting bottom plate 114 and is connected with the barrel body 105 to drive the barrel body to rotate. A suspension rod 117 is arranged between the mounting bottom plate 114 and the box body 112, the upper end of the suspension rod 117 is connected with the box body 112, and the lower end is connected with the mounting bottom plate 114 to suspend the washing barrel 100 and the water collecting structure in the box body 112.

The lower part of the washing barrel 100 is provided with a drain opening 118 and a plugging structure 119. The drain opening 118 communicates the inside of the barrel body 105 with the water collecting cavity 113. During water discharging, the plugging structure 119 opens the drain opening 118. The lower part of the mounting bottom plate is provided with a drainage pipe 120, and the drainage pipe 120 is communicated with the water collecting cavity 113, such that washing water entering the water collecting cavity 113 is discharged out of the washing machine through the drainage pipe 120. The plugging structure 119 is an electromagnetic valve plug.

The washing barrel includes a barrel body, the radius of the side wall of the barrel body increases synchronously from top to bottom in the rotating direction of the barrel body to form the radius section. The circumference of the barrel body is provided with four variable diameter segments 133 and four connecting sections 134, four variable diameter segments 133 are uniformly distributed on the circumference of the barrel body 105, and two ends of the connecting section 134 are respectively connected with the adjacent variable diameter segment 133 to close the circumference of the barrel body.

The inner wall, at the part with a larger radius, of the variable diameter segment 133 is provided with a cover body with a concave cavity. The cover body 101 includes a first side plate 108 opposite to the connecting section 134, a third side plate 110 opposite to the variable diameter segment 133 of the barrel body, and a bottom plate 132 arranged below the first side plate. The first side plate 108, the third side plate 110 and the bottom plate 130 together form the cover body 101 with a concave cavity 107. A water outlet 103 is formed at the lower part of the variable diameter segment 133, the cover body covers the water outlet 103 in the concave cavity and forms a drainage channel together with the inner wall of the variable diameter segment 133 and the connecting section 134, and the upper part of the first side plate is provided with a water inlet 103.

The part, opposite to the third side wall 110, on the reducer section inclines from top to bottom in the direction of the box body, and an accommodation cavity 106 is formed on the side wall of the barrel body. During dehydrating, the washing water in the barrel body moves from the part with a smaller radius to the part with a larger radius along the reducer section, the washing water is guided to the water inlet, dehydration is accelerated, and washing water entering the drainage channel from the water inlet is discharge rapidly along the inclined side wall on the reducer section, thereby further improving dehydrating efficiency.

The inner wall of the water collecting cavity 113 is provided with a locking structure 121, and the locking structure 121 is configured to lock the barrel body 105 and the water collecting structure.

What is described above is merely the preferred embodiments of the present disclosure, rather than limiting the present disclosure in any form, although the present disclosure has been disclosed above with the preferred embodiments, the preferred embodiments are not used for limiting the present disclosure, those skilled in the art can make some changes or modify into equivalent embodiments with equal changes by utilizing the above suggested technical contents without departing from the scope of the technical solution of the present disclosure, and the contents not departing from the technical solution of the present disclosure, any simple amendments, equivalent changes or modifications made to the above embodiments based on the technical essence of the present disclosure shall all fall within the scope of the solution of the present disclosure.

The invention claimed is:

1. A washing barrel, configured to accommodate washing water, comprising:
　a barrel body;
　a drainage channel arranged on a side wall of the barrel body and configured to discharge washing water in the barrel body out of the barrel body during dehydrating, wherein the drainage channel is provided with a water inlet communicated with an inside of the barrel body, and
　the barrel body is provided with a guiding part to guide washing water in the barrel body into the water inlet during dehydrating, the guiding part is a variable diameter segment formed by increasing a radius of the side wall of the barrel body along a rotating direction of the barrel body during dehydrating, the drainage channel is arranged on an inner wall of the variable diameter segment, the inner wall of the variable diameter segment is provided with a cover body with a cavity, the water inlet is arranged on the cover body and faces towards the rotating direction of the barrel body during dehydrating, and the cover body forms the drainage channel together with the inner wall of the variable diameter segment in the form of encirclement.

2. A washing machine provided with the washing barrel according to claim 1.

3. The washing barrel according to claim 1, wherein the drainage channel is arranged at a part with the biggest radius of the variable diameter segment.

4. The washing barrel according to claim 1, wherein the variable diameter segment in a circumferential direction is formed by increasing the radius of at least a section, at an axial direction, of the side wall of the barrel body along the rotation direction of the barrel body during dehydrating.

5. The washing barrel according to claim 4, wherein the barrel body is provided with at least one connecting segment in the circumferential direction;

the at least one connecting segment and the variable diameter segment are arranged at intervals, and two ends of the connecting segment are respectively connected with the variable diameter segment which is adjacent to the connecting segment to close the barrel body in the circumferential direction.

6. The washing barrel according to claim 4, wherein the radius of the side wall of the barrel body is synchronously increased from top to bottom along the rotating direction of the barrel body to form the variable diameter segment in the circumferential direction;

or, the radius of at least a part, arranged between an upper edge and a lower edge of the water inlet, of the side wall of the barrel body increases along the rotating direction of the barrel body during dehydrating, forming the variable diameter segment.

7. The washing barrel according to claim 5, wherein the barrel body is provided with a plurality of variable diameter segments in the circumferential direction, and the plurality of variable diameter segments are uniformly distributed in the circumferential direction of the barrel body.

8. The washing barrel according to claim 5, wherein one variable diameter segment and one connecting segment are provided, two ends of the one connecting segment are respectively connected with two ends of the one variable diameter segment, to close the circumference of the barrel body;

or, variable diameter segments and connecting segments are provided, the connecting segments and the variable diameter segments are arranged at intervals;

two ends of each of the connecting segments are respectively connected with end parts of two variable diameter segments connected with the connecting segment, to close the circumference of the barrel body.

9. A washing barrel, configured to accommodate washing water, comprising:

a barrel body;

drainage channels arranged on a side wall of the barrel body and configured to discharge washing water in the barrel body out of the barrel body during dehydrating, wherein the drainage channels are each provided with a water inlet communicated with an inside of the barrel body, and the barrel body is provided with guiding parts to guide washing water in the barrel body into the water inlet during dehydrating;

each guiding part is a variable diameter segment formed by increasing a radius of the side wall of the barrel body along a rotating direction of the barrel body during dehydrating, the drainage channels are arranged on inner walls of the variable diameter segments, each inner wall of the variable diameter segments is provided with a cover body with a cavity, each water inlet is arranged on the cover body and faces towards the rotating direction of the barrel body during dehydrating, and wherein the barrel body is provided with at least one connecting segment in a circumferential direction, the at least one connecting segment and the variable diameter segments are arranged at intervals, and two ends of each at least one connecting segment are connected with the variable diameter segments which are adjacent to the respective connecting segment to close the barrel body in the circumferential direction, the cover bodies form the drainage channels together with the inner walls of the variable diameter segments and the inner wall of the at least one connecting segment in the form of encirclement.

10. The washing barrel according to claim 9, wherein the variable diameter segments in a circumferential direction are formed by increasing the radius of at least respective sections, at an axial direction, of the side wall of the barrel body along the rotation direction of the barrel body during dehydrating.

11. The washing barrel according to claim 9, wherein the variable diameter segments are uniformly distributed in the circumferential direction of the barrel body.

12. A washing machine provided with the washing barrel according to claim 9.

13. The washing barrel according to claim 9, wherein the radius of the side wall of the barrel body is synchronously increased from top to bottom along the rotating direction of the barrel body to form the variable diameter segments in the circumferential direction;

or, the radius of at least a part, arranged between an upper edge and a lower edge of each water inlet, of the side wall of the barrel body increases along the rotating direction of the barrel body during dehydrating, forming the variable diameter segments.

14. A washing barrel, configured to accommodate washing water, comprising:

a barrel body;

a drainage channel arranged on a side wall of the barrel body and configured to discharge washing water in the barrel body out of the barrel body during dehydrating, wherein the drainage channel is provided with a water inlet communicated with an inside of the barrel body, and the barrel body is provided with a guiding part to guide washing water in the barrel body into the water inlet during dehydrating, the guiding part is a variable diameter segment formed by increasing a radius of the side wall of the barrel body along a rotating direction of the barrel body during dehydrating, the drainage channel is arranged on an inner wall of the variable diameter segment, the inner wall of the variable diameter segment is provided with a cover body with a cavity, the drainage channel is a drainage pipeline for allowing the washing water to flow through, and the water inlet is arranged on the drainage pipeline and faces towards the rotating direction of the barrel body during dehydrating.

15. The washing barrel according to claim 14, wherein the variable diameter segment in a circumferential direction is formed by increasing the radius of at least a section, at an axial direction, of the side wall of the barrel body along the rotation direction of the barrel body during dehydrating.

16. A washing machine provided with the washing barrel according to claim 9.

17. The washing barrel according to claim 14, wherein the radius of the side wall of the barrel body is synchronously increased from top to bottom along the rotating direction of the barrel body to form the variable diameter segment in the circumferential direction;

or, the radius of at least a part, arranged between an upper edge and a lower edge of the water inlet, of the side wall of the barrel body increases along the rotating direction of the barrel body during dehydrating, forming the variable diameter segment.

18. The washing barrel according to claim 15, wherein the barrel body is provided with at least one connecting segment in the circumferential direction;

two ends of the at least one connecting segment are respectively connected with the variable diameter segment which is adjacent to the connecting segment to close the barrel body in the circumferential direction.

19. The washing barrel according to claim 18, wherein the barrel body is provided with a plurality of variable diameter segments in the circumferential direction, and the plurality of variable diameter segments are uniformly distributed in the circumferential direction of the barrel body.

20. The washing barrel according to claim 18, wherein one variable diameter segment and one connecting segment are provided, two ends of the one connecting segment are respectively connected with two ends of the one variable diameter segment, to close the circumference of the barrel body;

or, variable diameter segments and connecting segments are provided, the connecting segments and the variable diameter segments are arranged at intervals;

two ends of each of the connecting segments are respectively connected with end parts of two variable diameter segments connected with the connecting segment, to close the circumference of the barrel body.

* * * * *